(12) United States Patent
Endo

(10) Patent No.: US 10,619,531 B2
(45) Date of Patent: Apr. 14, 2020

(54) IMAGE FORMING DEVICE

(71) Applicant: RISO KAGAKU CORPORATION, Tokyo (JP)

(72) Inventor: Toshihiro Endo, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 112 days.

(21) Appl. No.: 15/870,068

(22) Filed: Jan. 12, 2018

(65) Prior Publication Data
US 2018/0229510 A1 Aug. 16, 2018

(30) Foreign Application Priority Data
Feb. 15, 2017 (JP) .................................. 2017-025955

(51) Int. Cl.
| | | |
|---|---|---|
| *F01M 9/12* | (2006.01) | |
| *B41J 2/21* | (2006.01) | |
| *B41J 11/00* | (2006.01) | |
| *B41J 11/02* | (2006.01) | |
| *B41J 11/06* | (2006.01) | |
| *F01D 25/18* | (2006.01) | |
| *B41J 2/17* | (2006.01) | |
| *F16H 57/04* | (2010.01) | |

(52) U.S. Cl.
CPC .............. *F01M 9/12* (2013.01); *B41J 2/2103* (2013.01); *B41J 11/007* (2013.01); *B41J 11/0085* (2013.01); *B41J 11/02* (2013.01); *B41J 11/06* (2013.01); *F01D 25/18* (2013.01); *B41J 2/1714* (2013.01); *C10N 2240/00* (2013.01); *C10N 2240/02* (2013.01); *C10N 2240/06* (2013.01); *C10N 2240/52* (2013.01); *F16H 57/04* (2013.01); *F16H 57/045* (2013.01); *F16H 57/0434* (2013.01)

(58) Field of Classification Search
CPC ........ F01M 9/12; F01D 25/18; B41J 11/0085; B41J 11/06; B41J 2/2103; B41J 11/02; B41J 11/007; B41J 2/1714; F16H 57/0434; F16H 57/04; F16H 57/045; C10N 2240/00; C10N 2240/52; C10N 2240/02; C10N 2240/06
See application file for complete search history.

(56) References Cited

U.S. PATENT DOCUMENTS 4,301,725 A * 11/1981 Hiki ........................... B41J 1/20
101/111
2016/0251180 A1* 9/2016 Shinohara ................ B65H 5/36
271/275

FOREIGN PATENT DOCUMENTS

JP 2010-042628 2/2010

OTHER PUBLICATIONS

Alvarez-Lacalle et al. "Low viscosity contrast fingering in a rotating Hele-Shaw cell" (Physics of Fluids, vol. 16, No. 4, Apr. 2004) (Year: 2004).*

* cited by examiner

*Primary Examiner* — Justin Seo
(74) *Attorney, Agent, or Firm* — Hamre, Schumann, Mueller & Larson, P.C.

(57) ABSTRACT

As a lubricant present between a transfer belt for transferring a print sheet and a platen plate on a rear side thereof and bringing the both into close contact, a lubricant containing 70 weight % or more of a fatty acid ester solvent with carbon number in a molecule of 20 or more and 34 or less is used so as to reduce sliding between the transfer belt and the platen plate and sliding resistance generated between the transfer belt for transferring the print sheet and an auxiliary plate arranged along this.

2 Claims, 6 Drawing Sheets

FIG. 6

| | | C NUMBER | \multicolumn{13}{c|}{EXPERIMENT EXAMPLE} | COMPARATIVE EXAMPLE |
|---|---|---|---|---|---|---|---|---|---|---|---|---|---|---|---|
| | | | 1 | 2 | 3 | 4 | 5 | 6 | 7 | 8 | 9 | 10 | 11 | 12 | 13 | |
| ESTER SOLVENT | ISONONYL ISONONANOATE | 18 | 100 | | | | | | | | | | | | | NO APPLICATION OF LUBRICANT |
| | ISODECYL DECANOATE | 20 | | 100 | | | | | | | | | | | | |
| | 2-ETHYLHEXYL PALMITATE | 24 | | | 100 | | | | | | | | | | | |
| | 2-HEXYLDECYL STEARATE | 34 | | | | 100 | | | 70 | | | | | | | |
| | TRIMETHYLOLPROPANE TRIISOSTEARATE | 60 | | | | | 80 | | | | | | | 100 | 90 | |
| OTHER SOLVENTS | EXXSOL D130 | | | | | | | 100 | | | | | | | | |
| | MORESCO WHITE P-200 | | | | | | 20 | | 30 | 30 | | | | | | |
| | AF SOLVENT NO. 6 | | | | | | | | | | 100 | | | | | |
| | FINE OXOCOL 1600 | | | | | | | | | | | 100 | 100 | | 10 | |
| TOTAL | | | 100 | 100 | 100 | 100 | 100 | 100 | 100 | 100 | 100 | 100 | 100 | 100 | 100 | |
| LUBRICANT VISCOSITY mPa·s @23°C | | | 6.1 | 7.0 | 11.3 | 28.2 | 190 | 5.5 | 8.9 | 29.8 | 82.4 | 5.9 | 38.8 | 231 | 201 | – |
| INITIAL LUBRICITY | | | A | A | A | A | B | A | A | A | B | A | A | C | C | C |
| LUBRICITY AFTER PRINTING 1 MILLION SHEETS | | | C | A | A | A | B | C | A | A | B | C | C | C | C | C |
| EJECTING PERFORMANCE AFTER PRINTING 1 MILLION SHEETS | | | B | A | A | A | A | B | A | A | A | B | B | A | A | C |
| VOC OCCURRENCE | | | A | A | A | A | A | B | A | A | A | A | A | A | B | – |

| INITIAL LUBRICITY | A | LESS THAN 1.5A |
|---|---|---|
| | B | 1.5A OR MORE AND LESS THAN 2.0A |
| | C | 2.0A OR MORE |
| LUBRICITY AFTER PRINTING 1 MILLION SHEETS | A | LESS THAN 1.5A |
| | B | 1.5A OR MORE AND LESS THAN 2.0A |
| | C | 2.0A OR MORE |

| EJECTING PERFORMANCE AFTER PRINTING 1 MILLION SHEETS | A | LESS THAN 30 |
|---|---|---|
| | B | 30 OR MORE AND LESS THAN 50 |
| | C | 50 OR MORE |
| VOC OCCURRENCE | A | LESS THAN 2 μg/g |
| | B | 2 μg/g OR MORE |

IMAGE FORMING DEVICE

BACKGROUND

1. Technical Field

The present invention relates to an image forming device in which a print sheet is transferred by a transfer belt in a paper feed/discharge process of a print sheet to/from a printing unit and a print process or the like in the printing unit.

2. Related Art

In an inkjet printer, for example, a print sheet fed from a paper feed tray is transferred by an endless transfer belt extended between a driving roller and a driven roller. Then, an image is formed (printed) on a print sheet being transferred by the ink ejected from a nozzle of an inkjet head arranged by facing the transfer belt.

On a rear side of a portion in the transfer belt faced with the inkjet head, a flat-plate shaped platen plate is arranged in proximity to a rear surface of the transfer belt. By the presence of this platen plate, a portion of the print sheet on the transfer belt faced with the inkjet head can be held flatly, and a head gap can be kept at a predetermined interval from the inkjet head.

Incidentally, if the transfer belt and the platen plate are brought into sliding contact with each other by a foreign substance or the like having entered in a gap between the both, it is concerned that wear of the transfer belt advances, a transfer speed of the transfer belt is lowered from a normal speed by sliding resistance with the platen plate, and an excessive load is applied to a driving source (motor or the like) of the driving roller.

Accordingly, in order to reduce the sliding resistance between the transfer belt and the platen plate, cleaning of a surface of the platen by using a gap between the both is proposed in Japanese Patent Laid-Open No. 2010-42628.

SUMMARY

Problems to be Solved by the Invention

The present invention is to further improve the aforementioned past proposal, and an object of the present invention is to provide an image forming device which can reduce the sliding resistance generated between the transfer belt for a print sheet and an auxiliary plate arranged along that in the image forming device, not limited to sliding between the transfer belt and the platen plate.

Means to Solve the Problem

In order to achieve the aforementioned object, the image forming device according to the present invention includes, in an image forming device which transfers a print sheet by a transfer belt, a fluid in close contact with the transfer belt and an auxiliary plate along the transfer belt, respectively, the fluid is arranged between the transfer belt and the auxiliary plate.

Moreover, in the image forming device according to the present invention, the fluid may be a lubricant with viscosity at 23° C. of 200 mPa·s or less.

Furthermore, in the image forming device according to the present invention, the viscosity of the lubricant at 23° C. may be 40 mPa·s or less.

Moreover, in the image forming device according to the present invention, the fluid may contain 70 weight % or more of fatty acid ester solvent with carbon number in a molecule of 20 or more and 34 or less.

Furthermore, in the image forming device according to the present invention, the auxiliary plate may be a platen plate arranged at a predetermined interval by facing a nozzle head forming an image by ejecting an ink droplet onto the print sheet on the transfer belt.

Moreover, in the image forming device according to the present invention, the auxiliary plate may be a support plate with which a fixing member for fixing a toner image on the print sheet on the transfer belt is brought into pressure contact through the print sheet and the transfer belt.

BRIEF DESCRIPTION OF DRAWINGS

FIG. 6 is an explanatory view illustrating an evaluation result of a lubricant applied on a rear surface of a transfer belt in FIG. 2.

DETAILED DESCRIPTION

An inkjet printer according to an embodiment of the present invention will be described below with reference to the drawings.

[Constitution of Inkjet Printer]

Figure 1:
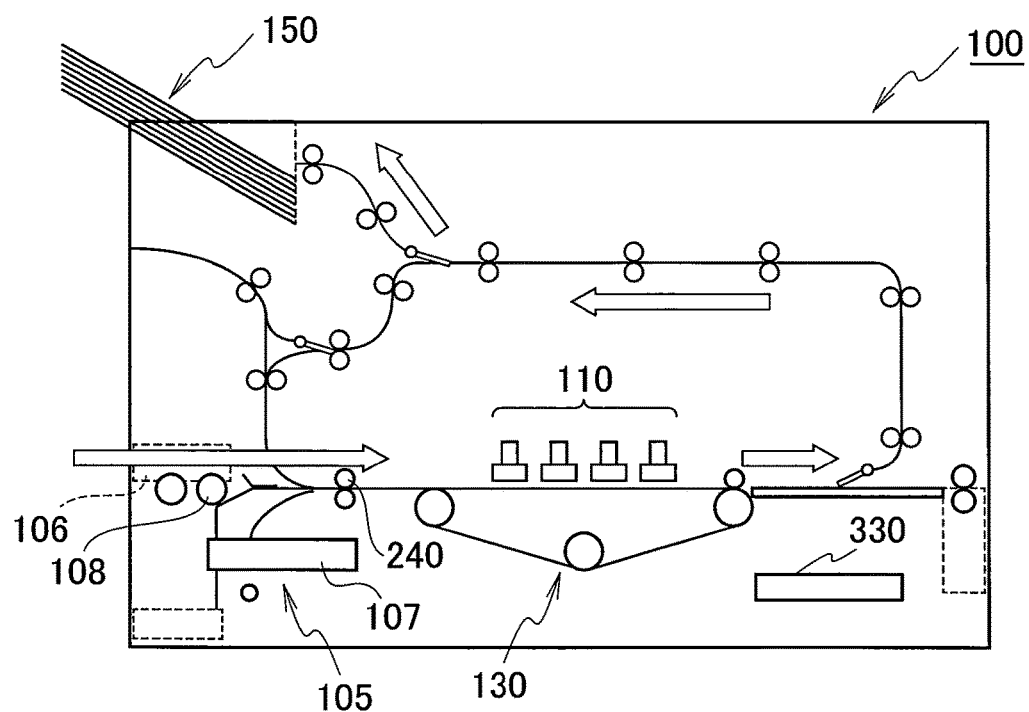
FIG. 1 is an outline sectional view illustrating an internal constitution of an inkjet printer according to an embodiment of the present invention.
Figure 2:
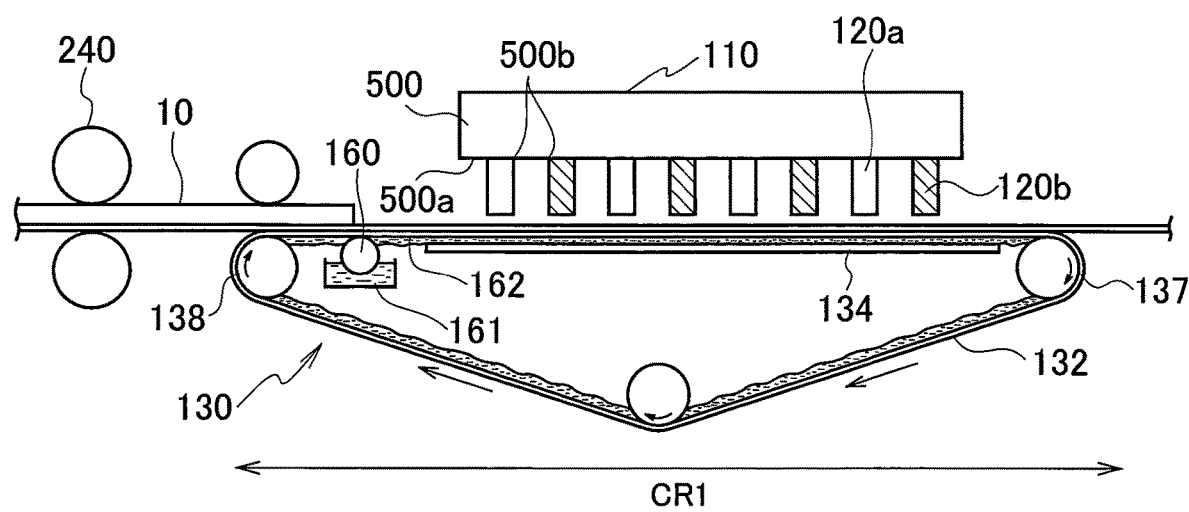
FIG. 2 is an explanatory view of an image forming path where image forming in FIG. 1 is performed, illustrated from a side.
Figure 3:
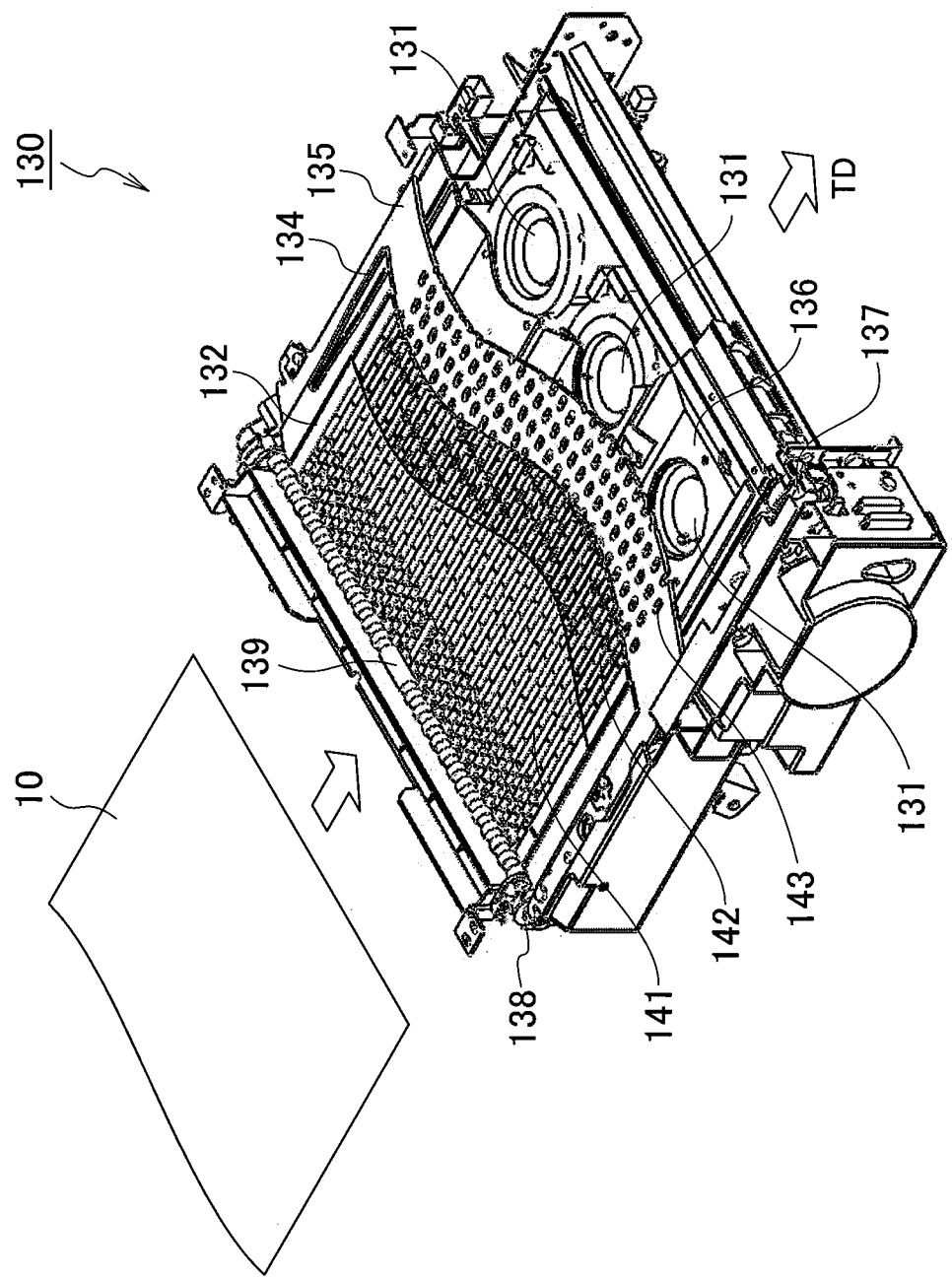
FIG. 3 is a partially cutaway perspective view illustrating a sheet transfer unit in FIG. 2.
Figure 4A:
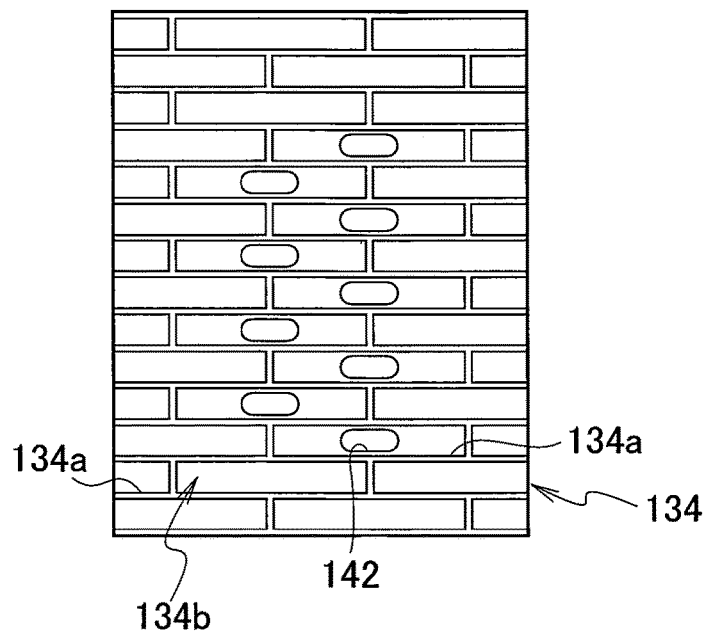
FIG. 4A is an enlarged plan view of an essential part of an example of a constitution of a platen plate in FIG. 3.
Figure 4B:
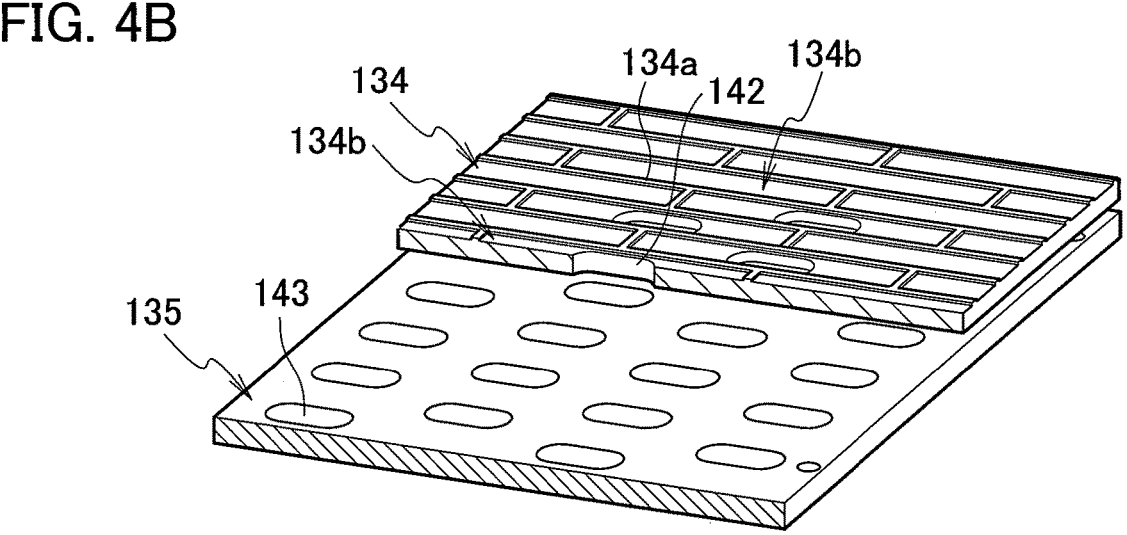
FIG. 4B is a partially cutaway enlarged perspective view of a portion in the essential part of the example of the constitution of the platen plate in FIG. 3.
Figure 4C:
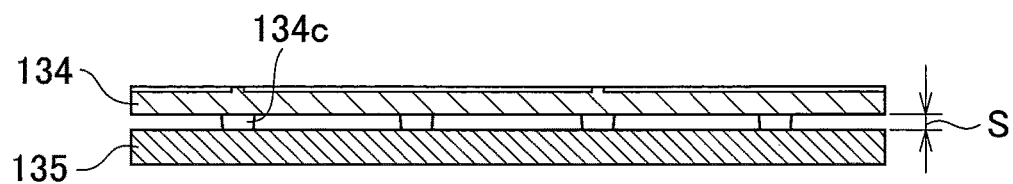
FIG. 4C is an enlarged side view of the essential part of an example of the constitution of the platen plate in FIG. 3.
Figure 5:
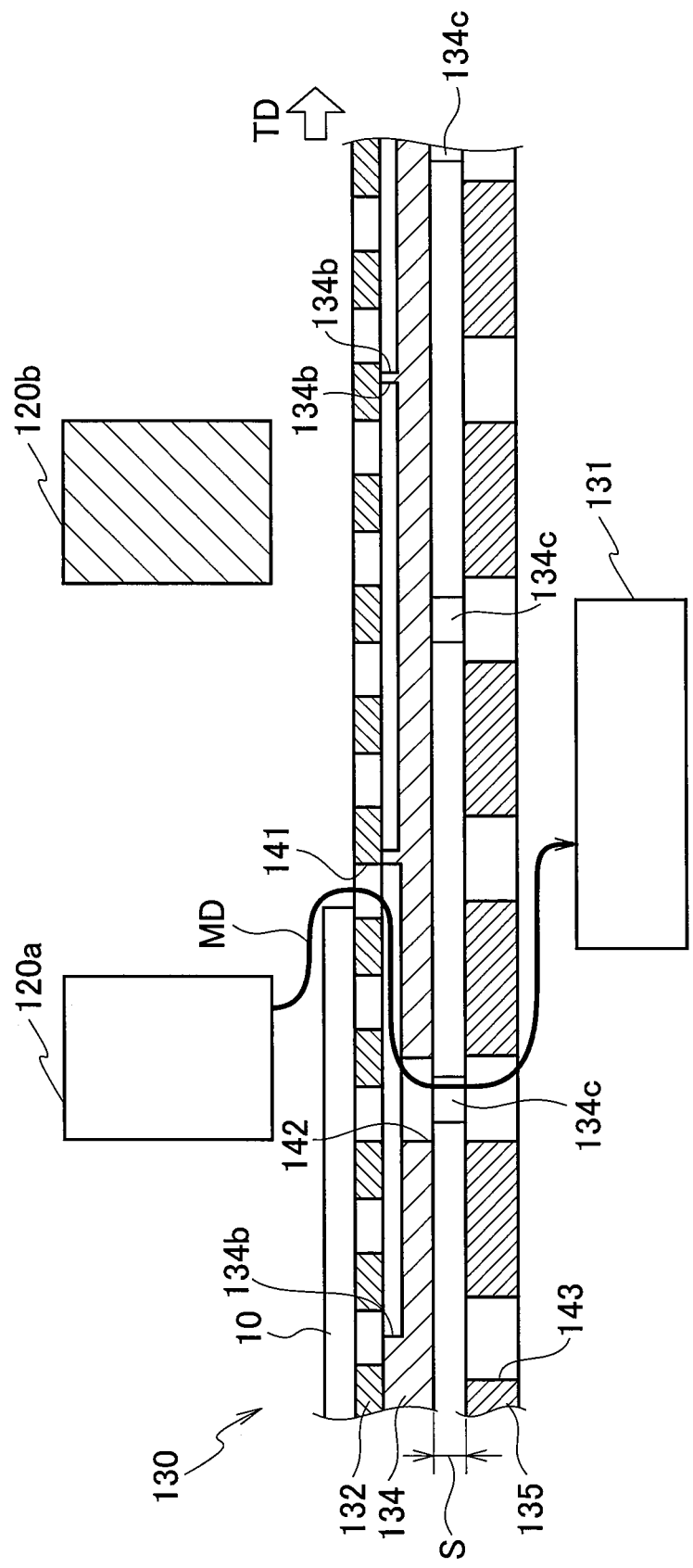
FIG. 5 is an enlarged side sectional view of the essential part of the sheet transfer unit in FIG. 2.

FIG. 1 is an outline sectional view illustrating an internal constitution of an inkjet printer according to an embodiment of the present invention. FIG. 2 is an explanatory view of an image forming path where image forming in FIG. 1 is performed, illustrated from a side. Further, FIG. 3 is a partially cutaway perspective view illustrating a sheet transfer unit in FIG. 2. FIG. 4A is an enlarged plan view of an essential part of an example of a constitution of a platen plate in FIG. 3. FIG. 4B is a partially cutaway enlarged perspective view of a portion in the essential part of the example of the constitution of the platen plate in FIG. 3. FIG. 4C is an enlarged side view of the essential part of an example of the constitution of the platen plate in FIG. 3. FIG. 5 is an enlarged side sectional view of a portion of the sheet transfer unit in FIG. 2.

As illustrated in FIG. 1, this inkjet printer 100 is an image forming device which forms an image by ejecting ink in each color from a nozzle of a head unit 110 on a print sheet 10 transferred on a transfer path.

The inkjet printer 100 of this embodiment includes, in addition to the head unit 110, a paper feed unit 105 for supplying the print sheet 10, a sheet transfer unit 130 for transferring the print sheet 10, a sheet discharge port 150 as a sheet discharge unit for discharging the printed print sheet 10, and the like.

Moreover, the inkjet printer 100 includes an arithmetic processing unit 330 constituted by a controller substrate or the like on which a CPU, a memory and the like are disposed, an operation panel for displaying a menu and receiving an operation from a user, and the other function units (not shown).

The head unit 110 extends in a direction orthogonal to a transfer direction TD of the print sheet 10, and includes a plurality of ink heads 120a and 120b (corresponding to the nozzle heads) on which a large number of nozzles (not shown) are formed and a head holder 500 for holding/fixing these ink heads 120a and 120b by a head holder surface 500a on a bottom portion. Each of the ink heads 120a and 120b protruding downward from a mounting opening portion 500b of the head holder surface 500a forms an image by a line unit by ejecting ink in black or colors from the nozzles toward the print sheet.

Note that, in the ink heads 120a and 120b held alternately by the head holder 500, the ink head 120b indicated by shading in the figure is disposed by shifting a position from the ink head 120a in the direction orthogonal to the sheet surface of FIG. 1.

The print sheet 10 fed one by one from a side paper supply table 106 or a paper feed tray 107 or the like in the paper feed unit 105 is transferred by a driving unit such as a roller 108 to resist rollers 240. Here, the resist rollers 240 are a pair of rollers provided for positioning of a distal end of the print sheet 10 and skew correction. The fed print sheet 10 is temporarily stopped at the resist rollers 240 and is transferred to the direction of the head unit 110 at predetermined timing.

On the TD side also in the farther transfer direction of the resist rollers 240, as illustrated in FIG. 2, an image forming path CR1 as a transfer path is provided. The image forming path CR1 has the sheet transfer unit 130. This sheet transfer unit 130 has a transfer belt 132 for transferring the print sheet 10 at a speed determined by a print condition.

FIG. 3 is a partially cutaway perspective view illustrating the sheet transfer unit 130 in FIG. 2. As illustrated in FIG. 3, the sheet transfer unit 130 includes, in addition to the transfer belt 132 for transferring the print sheet 10, a platen plate 134 (corresponding to an auxiliary plate) for supporting the transfer belt 132, an air-amount averaging plate 135 for making a suction pressure constant on a lower surface of the platen plate 134, and a chamber unit 136 communicating with a suction fan 131 which will be described later.

The transfer belt 132 has a large number of belt holes 141 at a certain interval, through which air for suctioning the print sheet 10 is passed. This transfer belt 132 is supported by the platen plate 134, extended between a driving roller 137 and a driven roller 138 in a pair arranged orthogonally to the transfer direction TD of the print sheet 10 and wound around the transfer direction TD, and slides on a surface of the platen plate 134.

The platen plate 134 is a plate-shaped plate member having a large number of suction holes 142. The suction holes 142 are penetrated at spots immediately above which the belt holes 141 pass during winding of the transfer belt 132. As illustrated in the plan view in FIG. 4A, a plurality of recess portions 134b partitioned by ribs 134a is formed on the surface of the platen plate 134, and the aforementioned suction holes 142 are opened on a bottom surface of a part of the recess portions 134b.

This recess portion 134b reduces sliding resistance between the transfer belt 132 and the platen plate 134 by allowing only the rib 134a portion of the platen plate 134 to be in sliding contact with the transfer belt 132. Moreover, the recess portion 134b prevents the opening of the suction holes 142 from being blocked by the transfer belt 132.

Moreover, the air-amount averaging plate 135 in which a large number of ventilation holes 143 are formed, is disposed below the platen plate 134. As illustrated in the side view illustrated in FIG. 4C, the platen plate 134 has a plurality of bosses 134c on the rear surface, and when distal ends of the boss 134c are brought into contact with the air-amount averaging plate 135, an interval S is ensured between the platen plate 134 and the air-amount averaging plate 135.

As illustrated in FIG. 3, a plurality of the suction fans 131 is disposed below the air-amount averaging plate 135, and each of the suction fans 131 is connected to the rear surface of the air-amount averaging plate 135 through the chamber unit 136, respectively.

In the enlarged side view in FIG. 5, the ink head 120a on the left side in the figure is disposed on the sheet surface in FIG. 5, and the ink head 120b indicated by shading on the right side in the figure is disposed on a depth side rather than the sheet surface in FIG. 5 in the direction orthogonal to the sheet surface.

Then, the platen plate 134 is disposed at a predetermined interval from the ink heads 120a and 120b. As a result, an interval (head gap) between the print sheet 10 on the transfer belt 132 and the ink heads 120a and 120b is regulated.

The suction fan 131 generates a negative pressure for suctioning the print sheet 10 on the transfer belt 132. By this negative pressure, as indicated by an arrow in FIG. 5, a path for suctioning the air on the transfer belt 132 (an arrow MD in FIG. 5) is formed to the suction fan 131 through the belt hole 141 in the transfer belt 132, the suction hole 142 in the platen plate 134, the interval S between the platen plate 134 and the air-amount averaging plate 135, and the ventilation hole 143 in the air-amount averaging plate 135.

Note that, the air suctioned by each of the suction fans 131 has its pressure averaged across the entire platen plate 134 when it passes through the ventilation hole 143 of the air-amount averaging plate 135. Therefore, the negative pressure generated in each of the suction holes 142 in the platen plate 134 becomes a uniform pressure. As a result, the negative pressure generated in each of the belt holes 141 in the transfer belt 132 also becomes a uniform pressure, and the print sheet 10 on the transfer belt 132 is suctioned by the transfer belt 132 by a uniform suctioning force.

As illustrated in FIG. 3, on supply side of the print sheet 10 in the sheet transfer unit 130 where the transfer belt 132 is fed out by the driven roller 138 along the platen plate 134, a sheet pressing roller 139 is arranged by facing the transfer belt 132. This sheet pressing roller 139 presses the print sheet 10 fed from the resist roller 240 of the paper feed unit 105 at the previous stage onto the transfer belt 132, and has it suctioned by the transfer belt 132 reliably by the suctioning force of the air.

In the sheet transfer unit 130 described above, the rear surface of the transfer belt 132 on the platen plate 134 side is in sliding contact with the platen plate 134 and worn. In order to suppress this wear or the like, in the inkjet printer 100 of this embodiment, a lubricant is applied on the rear surface of the transfer belt 132 so that it is interposed between the platen plate 134 and the transfer belt 132.

Specifically, as illustrated in FIG. 2, for example, an application roller 160 is disposed between the driven roller 138 on an upstream side of the platen plate 134 in a moving direction of the transfer belt 132 and the platen plate 134, and a portion of a circumferential surface of the application roller 160 is immersed in a lubricant case 161 at all times. Then, the application roller 160 on which a lubricant 162 in the lubricant case 161 adheres to the circumferential surface, is rolled on the rear surface of the transfer belt 132.

As a result, on the rear surface of the transfer belt 132, the lubricant 162 is uniformly applied by the application roller 160 between the driven roller 138 and the platen plate 134. The applied lubricant 162 is present in a gap between the transfer belt 132 and the platen plate 134 on a portion where the transfer belt 132 and the platen plate 134 are faced with each other and closely adheres to both the transfer belt 132 and the platen plate 134.

Therefore, the transfer belt 132 and the platen plate 134 are not in direct contact with each other anymore, and the lubricant 162 adhering to the transfer belt 132 is brought into sliding contact with the platen plate 134. Thus, the sliding resistance between the transfer belt 132 and the platen plate 134 is reduced by the lubricant 162, and advance of wear of the transfer belt 132 by the sliding contact with the platen plate 134 can be suppressed.

Moreover, in the inkjet printer 100 of this embodiment, a tail portion is separated from the ink droplet ejected from the nozzle of the ink head 120a or 120b, becomes a satellite (micro droplet) and then, becomes a mist to float around the transfer belt 132. Moreover, paper powders of the print sheet 10 transferred by the transfer belt 132 also float around the transfer belt 132.

If a gap into which such ink mist or paper powders can enter is present between the transfer belt 132 and the platen plate 134, the entering mist or paper powders increase the sliding resistance between the transfer belt 132 and the platen plate 134. Then, this increase in the sliding resistance causes promotion of the wear of the transfer belt 132, lowering of the moving speed of the transfer belt 132, or an increase in a load applied to the driving source such as a motor for rotating the driving roller 137 and the like.

On the other hand, in the inkjet printer 100 of this embodiment, the lubricant 162 applied on the rear surface of the transfer belt 132 is present in a gap between the transfer belt 132 and the platen plate 134 and thus, the gap into which the ink mist or paper powders can enter cannot easily exist between the transfer belt 132 and the platen plate 134.

Thus, the increase of the sliding resistance between the transfer belt 132 and the platen plate 134 by the ink mist or paper powders entering between the both is prevented, and the wear of the transfer belt 132, lowering of the moving speed or alternatively the increase in the load applied to the driving source of the driving roller 137 can be suppressed.

Moreover, the ink mist or the paper powders of the print sheet 10 floating around the transfer belt 132 are suctioned by the lubricant 162 applied on the rear surface of the transfer belt 132, and do not adhere to the periphery of the nozzles of the ink heads 120a and 120b anymore.

Thus, the ink mist or paper powders adhering to the periphery of the nozzle do not accumulate or clog the nozzle easily, and occurrence of defective ejection of the ink droplets by the ink heads 120a and 120b can be suppressed.

Here, regarding a solvent which can be considered to be used as the lubricant 162, the lower the viscosity is, the higher the volatility becomes in general. However, if volatility is high, lubricity is lost soon and thus, the viscosity of the lubricant at 23° C. is preferably 1 mPa·s or more, which is higher than that of water, and more preferably 5 mPa·s or more. On the other hand, if the viscosity is made too high in order to lower the volatility, the sliding resistance between the transfer belt 132 and the platen plate 134 cannot be sufficiently lowered.

As described above, the lubricant 162 desirably has low viscosity in order to lower the sliding resistance between the transfer belt 132 and the platen plate 134, and volatility is desirably low in order for a lubrication function to last long. Thus, it may be considered that an ester solvent which has relatively low viscosity but not readily volatilized is used for the lubricant 162.

Thus, composition of the lubricant considered to be used by being applied on the transfer belt 132 was evaluated. The evaluation result will be described below by referring to the explanatory view in FIG. 6.

FIG. 6 illustrates results when 13 types of lubricants with different solvents were applied on the transfer belt 132 as Experiment examples 1 to 13, respectively. Moreover, in order to be compared with Experiment examples 1 to 13, a result when the lubricant is not applied on the transfer belt 132 is illustrated as a comparative example.

FIG. 6 illustrates the results of evaluation in each item of viscosity of the lubricant at 23° C., initial lubricity of the lubricant, lubricity of the lubricant after printing 1 million sheets, ink ejecting performance after printing 1 million sheets, and occurrence of volatile organic compounds (VOC) components in an atmosphere.

Note that, in each of the aforementioned evaluation items, lubricity of the lubricant was evaluated in three stages of A to C by a driving current of the motor for rotating the driving roller 137 when a printing operation is performed by the inkjet printer 100 in FIG. 1 in which the lubricant was applied on the rear surface of the transfer belt 132 in FIG. 2.

Specifically, the lubricity when the driving current of the motor for rotating the driving roller 137 is less than 1.5 amperes substantially equal to that when a load applied to the motor is normal was evaluated as A, the lubricity when it is slightly higher at 1.5 amperes or more and less than 2.0 amperes as B, and the lubricity when it is 2.0 amperes or more which is close to the rated current of the motor as C.

Then, the lubricity after printing 1 million sheets was evaluated after a predetermined image was printed on 20 thousands print sheets having A3 size per day for 50 days, totaling in 1 million sheets.

Moreover, the ink ejecting performance after printing 1 million sheets was evaluated in three stages of A to C by printing the aforementioned 1 million sheets in total by the inkjet printer 100 in FIG. 1 in which the lubricant was applied on the rear surface of the transfer belt 132 in FIG. 2 and then, by a total sum of nozzles in which defective ejection of the ink occurred in the nozzles of the ink heads 120a and 120b in FIG. 2 when a test image of 30% solid printing for each of colors K (black), C (cyan), M (magenta), and Y (yellow) was printed, respectively.

Specifically, the ejection performance when the number of nozzles in which defective ejection of the ink occurred is less than 30 was evaluated as A, the ejection performance of 30 or more and less than 50 as B, and the ejection performance of 50 or more as C. Incidentally, the nozzles are provided in 3816 for each color in the ink heads 120a and 120b ejecting the ink in each color.

Note that, similarly to Experiment examples 1 to 13, the lubricity can be also evaluated by the driving current of the motor for rotating the driving roller 137 for the comparative example in which the lubricant is not applied on the transfer belt 132. As a result, regarding each of the items of the comparative example, the initial lubricity of the lubricant, the lubricity of the lubricant after printing 1 million sheets, and ejecting performances of the ink after printing 1 million sheets were all evaluated as C.

Moreover, the occurrence of VOC in the atmosphere was evaluated in two stages of A and B by an amount of volatile organic compounds (VOC) volatilized from the lubricant quantified by a thermal desorption GCMS method (thermal desorption+gas chromatography and mass spectroscopy method) in a gas caught from a space in which an air flow substantially equal to a transfer air flow of the print sheet 10 occurring in the periphery of the transfer belt 132 in FIG. 2 is generated and the lubricant at a room temperature (24° C.) left for 30 minutes.

Note that, the amount of the volatile organic compounds (VOC) is a generation amount from a sample (lubricant) acquired in terms of toluene, and those detected from hexane (carbon number 6) to hexadecane (carbon number 16) were defined to be the volatile organic compounds (VOC). Then, when the amount of the volatile organic compounds (VOC) in the gas is less than 2 µg/g in terms of toluene, it was evaluated as A, and in the case of 2 µg/g or more, it was evaluated as B.

Subsequently, in the lubricants whose evaluation results are illustrated in FIG. 6, the lubricants in Experiment examples 1 to 4 and 12 (Experiments 1 to 4, 12 in the figure) are lubricants using 100 weight % of ester solvents.

The ester solvents used in each lubricant are specifically isononyl isononanoate with the carbon number (C number) in the molecule of 18, isodecyl decanoate having the carbon number (C number) of 20, 2-ethylhexyl palmitate with the carbon number (C number) of 24, 2-hexyldecyl stearate with the carbon number (C number) of 34, and trimethylolpropane triisostearate with the carbon number (C number) of 60.

Then, the lubricants in Experiment examples 2 to 4 using 100 weight % of isodecyl decanoate having the carbon number (C number) of 20, 2-ethylhexyl palmitate with the carbon number (C number) of 24, and 2-hexyldecyl stearate with the carbon number (C number) of 34 had viscosity of the lubricants at 23° C. of 7.0 mPa·s, 11.3 mPa·s, and 28.2 mPa·s, respectively, and since the evaluations of all the other items were A, it was found that they had extremely excellent characteristics as the lubricants.

On the other hand, the lubricant in Experiment example 1 using 100 weight % of isononyl isononanoate with the carbon number (C number) of 18 had viscosity of the lubricants at 23° C. of 6.1 mPa·s, and the evaluations of the respective items of the initial lubricity of the lubricant and the VOC occurrence in the atmosphere were both A, and it was found that the lubricant had good characteristics.

However, the evaluation of lubricity of the lubricant after printing 1 million sheets is C equal to the case not using the lubricant, and it was found that the characteristics were largely poorer than those of the lubricants in Experiment examples 2 to 4 in terms of persistence of lubricity. Moreover, since the evaluation of ejecting performance of the ink after printing 1 million sheets was also B, it was found that the characteristics were slightly poorer than those of the lubricants in Experiment examples 2 to 4 in terms of the ink ejecting stability.

Further, the lubricant in Experiment example 12 using 100 weight % of trimethylolpropane triisostearate with the carbon number (C number) of 60 had evaluations of A in both the items of the ink ejecting performance after printing 1 million sheets and VOC occurrence in the atmosphere and it was found to have good characteristics.

However, since the viscosity of the lubricant at 23° C. was 231 mPa·s and the evaluations of the initial lubricity of the lubricant and the lubricity of the lubricant after printing 1 million sheets were both C equal to the case not using the lubricant, it was found that the characteristics of the lubricant were largely poorer than the lubricants in Experiment examples 1 to 4 in terms of viscosity and lubricity.

Subsequently, in the lubricants whose evaluation results are illustrated in FIG. 6, the lubricants in Experiment examples 6, 9 to 11 (Experiments 6, 9 to 11 in the figure) are lubricants using 100 weight % of the solvents other than ester.

The solvents other than ester used in each of the lubricants are specifically, those under a product name "Exxsol D130" (manufactured by Tonen General Sekiyu K.K., petroleum hydrocarbon solvent), a product name "Moresco White P-200" (manufactured by MORESCO Corporation, petroleum hydrocarbon solvent), a product name "AF Solvent No. 6" (manufactured by JX Energy Corporation, petroleum hydrocarbon solvent), and a product name "Fine Oxocol 1600" (manufactured by Nissan Chemical Industries, Ltd., higher alcohol solvent).

Then, the lubricant using 100 weight % of Moresco White P-200 in Experiment example 9 was found to have evaluations A for both of the items of the ink ejecting performance after printing 1 million sheets and the VOC occurrence in the atmosphere and to have good characteristics.

However, since the viscosity of the lubricant at 23° C. was 82.4 mPa·s and the evaluations in the respective items of the initial lubricity of the lubricant and the lubricity of the lubricant after printing 1 million sheets were both B, it was found that the characteristics of the lubricant were slightly poorer than the lubricants in Experiment examples 2 to 4 in terms of viscosity and initial lubricity.

Moreover, the lubricants using 100 weight % of AF solvent No. 6 and Fine Oxocol 1600 in Experiment examples 10 and 11 had viscosities of the lubricants at 23° C. of 5.9 mPa·s and 38.8 mPa·s, respectively, and the evaluations in the respective items of the initial lubricity of the lubricant and the VOC occurrence in the atmosphere were both A and they were found to have good characteristics, respectively.

However, since the evaluation of the lubricity of the lubricants after printing 1 million sheets was C equal to the case not using the lubricant, it was found that the characteristics of the lubricants were largely poorer than the lubricants in Experiment examples 2 to 4 in terms of persistence of lubricity. Moreover, since the evaluation of the ink ejecting performance after printing 1 millon sheets was also B, it was found that the characteristics of the lubricants were slightly poorer than those of the lubricants in Experiment examples 2 to 4, 9, and 12 in terms of the ink ejecting stability.

Furthermore, the lubricant in Experiment example 6 using 100 weight % of Exxsol D130 had the viscosity of the lubricant at 23° C. of 5.5 mPa·s and the evaluation of the initial lubricity of the lubricant was both A, and it was found that the lubricant had good characteristics.

However, since the evaluation of the lubricity of the lubricant after printing 1 million sheets was C equal to the case not using the lubricant, it was found that the characteristics of the lubricant were largely poorer than those of the lubricants in Experiment examples 2 to 4 in terms of persistence of lubricity. Moreover, since the evaluation in the items of the ink ejecting performance after printing 1 million sheets and VOC occurrence in the atmosphere were both B, it was found that the characteristics of the lubricant were slightly poorer than those of the lubricants in Experiment examples 2 to 4, 9, 12 in terms of the ink ejecting stability and are slightly poorer than those of the lubricants in Experiment examples 2 to 4, 9, 12 in terms of the VOC occurrence.

The lubricants of each of the remaining Experiment examples 5, 7, 8, 13 (Experiments 5, 7, 8, 13 in the figure) are lubricants in which the ester solvent and the solvent other than ester are mixed.

Then, regarding the lubricant in Experiment example 7 in which 30 weight % of AF solvent NO. 6 was mixed with 70 weight % of 2-hexyldecyl stearate with the carbon number (C number) of 34 and the lubricant in Experiment example 8 in which 30 weight % of Moresco White P-200 was mixed with 70 weight % of isodecyl decanoate having the carbon number (C number) of 20, the viscosities of the lubricants at 23° C. were 8.9 mPa·s and 29.8 mPa·s, respectively, and all the evaluations in the other items are also A and thus, it was found that they had extremely excellent characteristics as the lubricant.

On the other hand, the lubricant in Experiment example 5 in which 20 weight % of AF solvent No. 6 was mixed with 80 weight % of trimethylolpropane triisostearate with the carbon number (C number) of 60 had the evaluations A in both the items of the ink ejecting performance after printing 1 million sheets and the VOC occurrence in the atmosphere, and it was found that the lubricant had good characteristics.

However, since the viscosity of the lubricant at 23° C. was 190 mPa·s and the evaluations in the respective items of the initial lubricity of the lubricant and lubricity of the lubricant after printing 1 million sheets were both B, it was found that the characteristics were slightly poorer than those of the lubricants in Experiment examples 2 to 4, 7, 8 in terms of the viscosity and the initial lubricity.

Moreover, the lubricant in Experiment example 13 in which 10 weight % of Exxsol D130 was mixed with 90 weight % of trimethylolpropane triisostearate with the carbon number (C number) of 60 had the evaluation A of the ink ejecting performance after printing 1 million sheets, and it was found that the lubricant had good characteristics.

However, since the viscosity of the lubricant at 23° C. was 201 mPa·s and the evaluations in the respective items of the initial lubricity of the lubricant and the lubricity of the lubricant after printing 1 million sheets are C equal to the case not using the lubricant, it was found that the characteristics were largely poorer than those of the lubricants in Experiment examples 1 to 4, 6 to 8, 10, 11 in terms of the viscosity and the initial lubricity. Moreover, since the evaluation of the VOC occurrence in the atmosphere is B, it was found that the characteristics were slightly poorer than those of the lubricants in Experiment examples 1 to 5, 7 to 12 in terms of the VOC occurrence.

Then, in the inkjet printer 100 in FIG. 1, since the lubricant 162 is applied on the rear surface of the transfer belt 132 at all times by the application roller 160 in FIG. 2, even when the lubricant with high volatility is used, the sliding resistance between the transfer belt 132 and the platen plate 134 can be kept low.

Thus, for the lubricant 162 to be applied on the rear surface of the transfer belt 132 by the application roller 160 in FIG. 2, all the lubricants whose evaluation of the ink ejecting performance after printing 1 million sheets is not C can be used. Thus, in the lubricants whose evaluation results are illustrated in FIG. 6, all the lubricants in Experiment examples 1 to 13 can be used.

However, by using the lubricants in Experiment examples 1 to 11 with the viscosities of the lubricants at 23° C. of 200 mPa·s or less, since the evaluations of the initial lubricities of the lubricants are either A or B, the initial lubricity can be improved than the case not using the lubricant, and the sliding resistance between the transfer belt 132 and the platen plate 134 at least at the beginning of start of use of the lubricant can be lowered.

Moreover, by using the lubricants in Experiment examples 1 to 4, 6 to 8, 10, 11 with the viscosities of the lubricants at 23° C. of 40 mPa·s or less, since the evaluations of the initial lubricities of the lubricants are A, the initial lubricity can be further improved, and the sliding resistance between the transfer belt 132 and the platen plate 134 at least at the beginning of start of use of the lubricant can be sufficiently lowered.

Furthermore, in the lubricants in Experiment examples 1 to 4, 6 to 8, 10, 11 with the viscosities of the lubricants at 23° C. of 40 mPa·s or less, by using the lubricants in Experiment examples 2 to 4, 7, 8 containing 70 weight % or more of fatty acid ester solvents with the carbon number in the molecule of 20 or more and 34 or less, the evaluations of the respective items other than the initial lubricity of the lubricants also become A.

Thus, the persistence of the lubricity and ink ejecting stability can be further improved, the sliding resistance between the transfer belt 132 and the platen plate 134 can be kept stably lower for a long time, and the VOC occurrence can be also suppressed.

Note that, not limited to the lubricants in Experiment examples 2 to 4, 7, 8, which have the viscosity of the lubricant at 23° C. of 40 mPa·s or less, it is needless to say that the lubricating oil containing 70 weight % or more of the fatty acid ester solvents with the carbon number in the molecule of 20 or more and 34 or less can be realized also with the lubricating oil with relatively high viscosity at 23° C. of 40 mPa·s or more.

Moreover, the constitution of suppressing the wear or the like of the transfer belt for the print sheet 10 by application of the lubricant can be also applied to an image forming device of methods other than the aforementioned inkjet printer 100.

Figure 7:
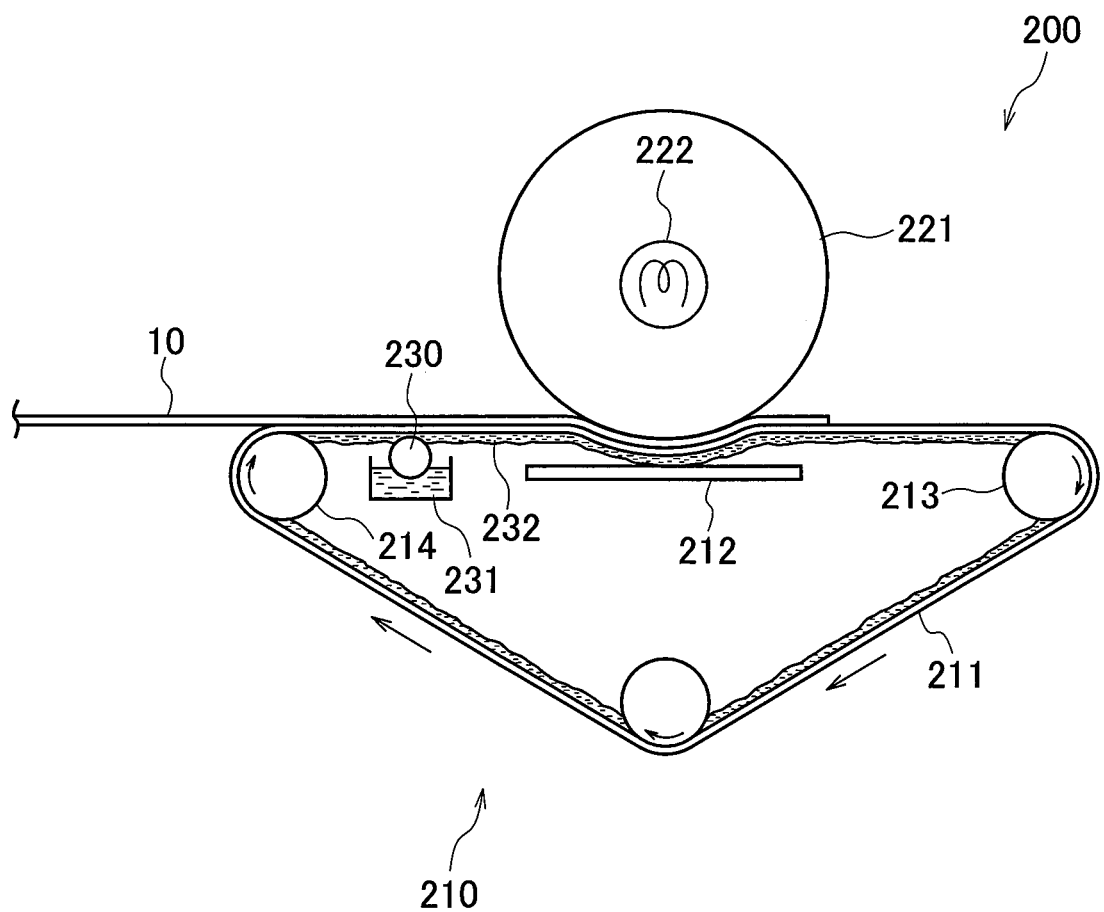
FIG. 7 is an explanatory view illustrating an outline constitution of a fixing unit of a laser beam printer according to another embodiment of the present invention.

FIG. 7 is an explanatory view illustrating an outline constitution of a fixing unit of a laser beam printer according to another embodiment of the present invention.

A fixing unit 200 illustrated in FIG. 7 is provided in a laser beam printer (corresponding to an image forming device) together with a photoreceptor drum on which a latent image corresponding to an image to be printed on the print sheet 10 is drawn by a laser beam, a developing device for developing the latent image on the photoreceptor drum by the toner, a transfer unit for transferring the developed toner image on the photoreceptor drum to the print sheet 10 and the like (none of them is shown).

This fixing unit 200 is to fix the toner image, transferred by the transfer unit from on the photoreceptor drum onto the print sheet 10, on the print sheet 10 and has a sheet transfer unit 210 and a fixing roller 221.

The sheet transfer unit 210 includes a support plate 212 (corresponding to an auxiliary plate) for supporting a transfer belt 211, in addition to the transfer belt 211 for transferring the print sheet 10. This transfer belt 211 is extended between a driving roller 213 and a driven roller 214 in a pair disposed orthogonally to the transfer direction TD of the print sheet 10 and wound around the transfer direction TD, and slides on the surface of the support plate 212.

The fixing roller 221 is disposed at a spot faced with the support plate 212 by sandwiching the transfer belt 211 between them. The fixing roller 221 is a hollow roller having a heater 222 therein, and a circumferential surface of the fixing roller 221 is brought into pressure contact with the support plate 212 through the transfer belt 211.

In the fixing unit 200 constituted as above, the toner image on the print sheet 10 transferred by the transfer unit from on the photoreceptor drum is fixed on the print sheet 10 by pressure-contact of the circumferential surface of the fixing roller 221 heated by the heater 222 when the print sheet 10 passes between the transfer belt 211 and the fixing roller 221.

Also in the fixing unit 200 of this embodiment described above, the rear surface of the transfer belt 211 on the support plate 212 side is brought into sliding contact with the support plate 212 and worn. In order to suppress this wear or the like, also in the laser beam printer in this embodiment, the lubricant is applied on the rear surface of the transfer belt 211 so as to be present between the support plate 212 and the transfer belt 211.

Specifically, by disposing an application roller 230 between the driven roller 214 on the upstream side from the support plate 212 in the moving direction of the transfer belt 211 and the support plate 212, for example, a part of the circumferential surface of the application roller 230 is immersed in a lubricant case 231 at all times. Then, the application roller 230 on which a lubricant 232 in the lubricant case 231 adheres to the circumferential surface is rolled on the rear surface of the transfer belt 211.

As a result, on the rear surface of the transfer belt 211, the lubricant 232 is uniformly applied by the application roller 230 between the driven roller 214 and the support plate 212. The applied lubricant 232 is present in a gap between the transfer belt 211 and the support plate 212 on a portion where the transfer belt 211 and the support plate 212 are faced with each other, and closely adheres to both the transfer belt 211 and the support plate 212.

Therefore, the transfer belt 211 and the support plate 212 are not in direct contact with each other anymore, and the lubricant 232 adhering to the transfer belt 211 is brought into sliding contact with the support plate 212. Thus, the sliding resistance between the transfer belt 211 and the support plate 212 is reduced by the lubricant 232, and advance of wear of the transfer belt 211 by the sliding contact with the support plate 212 can be suppressed.

Here, the lubricant 232 to be applied on the transfer belt 211 of the fixing unit 200 is heated by heat of the heater 222 in the fixing roller 221 brought into pressure contact with the transfer belt 211 and thus, viscosity is lowered and volatility increases from those at a normal temperature.

Thus, the solvent used as the lubricant 232 may have relatively higher viscosity at the normal temperature and instead, the volatility at the normal temperature can be considered to be lowered.

Thus, for the lubricant 232 to be applied on the transfer belt 211, the lubricants in Experiment examples 1 to 5, 7 to 12 with lower volatility and less VOC occurrence can be considered to be used in the lubricants in Experiment examples 1 to 13 illustrated in FIG. 6.

Among them, in the lubricants in Experiment examples 1 to 4, 7, 8, 10, 11 with the viscosity of the lubricant at 23° C. of 40 mPa·s or less, by using the lubricants in Experiment examples 2 to 4, 7, 8 containing 80 weight % or more of fatty acid ester solvents with the carbon number in the molecule of 20 or more and 34 or less, the evaluations in the respective items of the initial lubricity of the lubricant and the lubricity of the lubricant after printing 1 million sheets become A or B.

Thus, when being heated by the heat of the heater 222 in the fixing roller 221, the viscosity of the lubricant can be expected to be that corresponding to the evaluation A. Therefore, under an operational environment of the fixing unit 200, by using the lubricants in Experiment examples 2 to 5, 7 to 9 in FIG. 6, similarly to the case of using the lubricants in Experiment examples 2 to 4, 7, 8 at the normal temperature, persistence of lubricity and the ink ejecting stability can be further improved, the sliding resistance between the transfer belt 132 and the platen plate 134 can be kept stable and lower for a long time, and the VOC occurrence can be also suppressed.

Effect of Embodiments

As described in detail as above, the image forming device according to the present invention includes, in the image forming device which transfers the print sheet by the transfer belt, a fluid in close contact with each of the transfer belt and the auxiliary plate along the transfer belt, the fluid is arranged between the transfer belt and the auxiliary plate. Thus, not limited to the sliding between the transfer belt and the platen plate, the sliding resistance generated between the transfer belt for the print sheet and the auxiliary plate arranged along that in the image forming device can be reduced. That is, since the fluid arranged between the transfer belt and the auxiliary plate is in close contact with the transfer belt and the auxiliary plate, respectively, when the transfer belt is moved with respect to the auxiliary plate, the transfer belt is brought into sliding contact with the fluid, and the fluid is brought into sliding contact with the auxiliary plate. Moreover, since the fluid is present between the transfer belt and the auxiliary plate, entry of a foreign substance which interferes with movement of the transfer belt with respect to the auxiliary plate between the both can be also prevented.

Thus, the sliding resistance generated between the transfer belt and the auxiliary plate can be reduced, and advance of the wear of the transfer belt by sliding contact with the auxiliary plate, lowering of the moving speed of the transfer belt by the sliding resistance with the auxiliary plate or the foreign substance entering between that and the auxiliary plate from the normal speed or application of an excessive load to the driving source of the transfer belt can be prevented.

Moreover, in the image forming device according to the present invention, the fluid may be the lubricant with the viscosity at 23° C. of 200 mPa·s or less. By setting the viscosity of the lubricant at 23° C. to 200 mPa·s or less, the lubricant can be disposed between the transfer belt and the auxiliary plate and the lubricity of the lubricant immediately after being brought into close contact with them can be improved such that the wear of the transfer belt by friction with the lubricant, lowering of the moving speed of the transfer belt by contact with the lubricant, or alternatively the increase of the load applied to the driving source of the transfer belt is within an allowable range.

Moreover, in the image forming device according to the present invention, the lubricant may have the viscosity of 40 mPa·s or less at 23° C. By setting the viscosity of the lubricant at 23° C. to 40 mPa·s or less, the lubricant can be disposed between the transfer belt and the auxiliary plate and the lubricity of the lubricant immediately after being brought into close contact with them can be further improved such that the wear of the transfer belt by friction with the lubricant, lowering of the moving speed of the transfer belt by contact with the lubricant, or the increase of the load applied to the driving source of the transfer belt is within a range sufficiently lower than just in the allowable range.

Moreover, in the image forming device according to the present invention, the fluid may contain 70 weight % or more of the fatty acid ester solvent with the carbon number in the molecule of 20 or more and 34 or less. By choosing the fluid containing 70 weight % or more of the fatty acid ester solvent with the carbon number in the molecule of 20 or more and 34 or less for the fluid to be disposed between the transfer belt and the auxiliary plate, even after it is disposed between the transfer belt and the auxiliary plate and brought into close contact with them and then, an image is formed on a certain number of print sheets, the lubricity of the fluid can be maintained to such a degree that the wear of the transfer belt by friction with the fluid, lowering of the moving speed of the transfer belt by contact with the fluid, or the increase of the load applied to the driving source of the transfer belt is within a range sufficiently lower than just in the allowable range.

Moreover, the lubricant containing 70 weight % or more of the fatty acid ester solvent with the carbon number in the molecule of 20 or more and 34 or less has low volatility at a room temperature (24° C.) and high fixing performance between the transfer belt and the auxiliary plate and thus, the lubrication function of the lubricant can be exerted for a long time, and a reduction effect of the sliding resistance between the transfer belt and the auxiliary plate can be maintained for a long time.

Moreover, since volatilization of the volatile organic compounds (VOC) components contained in the lubricant is suppressed, filling of the volatilized organic compounds components in peripheral spaces of the transfer belt and the auxiliary plate can be suppressed.

Furthermore, in the image forming device according to the present invention, the auxiliary plate may be a platen plate arranged at a predetermined interval by facing the nozzle head forming an image by ejecting the ink droplets onto the print sheet on the transfer belt.

In this case, the fluid exerts lubricity immediately after being brought into close contact with the transfer belt and the platen plate, respectively, such that the wear of the transfer belt by friction with the fluid, lowering of the moving speed of the transfer belt by contact with the fluid, or the increase of the load applied to the driving source of the transfer belt is at least within an allowable range. Thus, the sliding resistance generated between the transfer belt for the print sheet and the platen plate arranged along this in the image forming device can be reduced.

Moreover, since the fluid is present in a gap between the transfer belt and the platen plate, a space cannot be easily generated between the both. Thus, the ink mist made to flow by the transfer air flow to the transfer direction TD of the print sheet generated between the nozzle head and the transfer belt by movement of the transfer belt and the paper powders floating up between the nozzle head and the transfer belt by the air pressure by movement of the transfer belt cannot easily enter the gap between the transfer belt and the platen plate.

Thus, accumulation of the ink mist or paper powders between the transfer belt and the platen plate can be prevented, and the sliding resistance generated between the transfer belt for the print sheet and the platen plate arranged along this in the image forming device can be reduced.

Therefore, advance of the wear of the transfer belt, lowering of the moving speed of the transfer belt from the normal speed, or application of the excessive load to the driving source of the transfer belt can be prevented.

Moreover, in the image forming device according to the present invention, the auxiliary plate may be the support plate with which the fixing member for fixing the toner image on the print sheet on the transfer belt is brought into pressure contact through the print sheet and the transfer belt.

In this case, even after the fluid is disposed between the transfer belt and the auxiliary plate, and brought into close contact with them and then, an image is formed on a certain number of print sheets, the fluid exerts lubricity such that the wear of the transfer belt by friction with the fluid, lowering of the moving speed of the transfer belt by contact with the fluid, or the increase of the load applied to the driving source of the transfer belt are within a range sufficiently lower than just in the allowable range.

Thus, the sliding resistance generated between the transfer belt for the print sheet and the support plate disposed along this and on which the fixing member is indirectly brought into pressure contact in the image forming device can be reduced.

Therefore, advance of the wear of the transfer belt, lowering of the moving speed of the transfer belt from the normal speed, or application of the excessive load to the driving source of the transfer belt can be prevented.

Another Embodiment

Note that, in each of the aforementioned embodiments, the constitution in which the lubricant 162, 232 is applied on the transfer belt 132, 211 by the application roller 160, 230 is provided in the inkjet printer 100 or the fixing unit 200 in the laser beam printer.

However, by allowing the lubricant 162, 232 to be present at manufacture, for example, between the transfer belt 132 and the platen plate 134 or between the transfer belt 211 and the support plate 212, the constitution in which the lubricant 162, 232 is applied on the transfer belt 132, 211 by the application roller 160, 230 may be omitted.

Moreover, in the aforementioned embodiment, as examples of the auxiliary plate, the platen plate 134 disposed at a spot faced with the ink heads 120a and 120b by sandwiching the transfer belt 132 or the support plate 212 disposed at a spot faced with the fixing roller 221 by sandwiching the transfer belt 211 has been explained.

However, the position of the auxiliary plate may be, as long as it is at a position along the transfer belt or any other spots, at a spot faced with a component other than the inkjet head or the fixing roller.

Furthermore, the present invention can be widely applied to an image forming device which transfers the print sheet by the transfer belt, not limited to the inkjet printer 100 or the laser beam printer as in each of the aforementioned embodiments.

The present application claims priority based on Japanese Patent Application No. 2017-025955 filed on Feb. 15, 2017, and the entire contents thereof are incorporated herein by reference.

REFERENCE SIGNS LIST 10 print sheet
100 inkjet printer (image forming device)

105 paper feed unit
106 side paper supply table
107 paper feed tray
108 roller
110 head unit
120a, 120b ink head (nozzle head)
130, 210 sheet transfer unit
131 suction fan
132, 211 transfer belt
134 platen plate (auxiliary plate)
134a rib
134b recess portion
134c boss
135 air-amount averaging plate
136 chamber unit
137, 213 driving roller
138, 214 driven roller
139 sheet pressing roller
141 belt hole
142 suction hole
143 ventilation hole
150 sheet discharge port
160, 230 application roller
161, 231 lubricant case
162, 232 lubricant
200 fixing unit
212 support plate (auxiliary plate)
222 heater
240 resist roller
330 arithmetic processing unit
500 head holder
500a head holder surface
500b mounting opening portion
CR1 image forming path
S interval between platen plate and air-amount averaging plate

What is claimed is:

1. An image forming device that transfers a print sheet, comprising:
a transfer belt configured to transfer the print sheet;
an auxiliary plate disposed along the transfer belt; and
a fluid arranged between and in close contact with the transfer belt and the auxiliary plate,
wherein the auxiliary plate is a platen plate arranged at a predetermined interval facing a nozzle head configured to form an image by ejecting an ink droplet onto the print sheet on the transfer belt,
the fluid is a lubricant with a viscosity at 23° C. of 200 mPa·s or less, and
the fluid contains 70 weight % or more of a fatty acid ester solvent having 20 or more and 34 or less carbon atoms in a molecule.

2. The image forming device according to claim 1, wherein the viscosity of the lubricant at 23° C. is 40 mPa·s or less.

* * * * *